US010461957B2

(12) United States Patent
Lu et al.

(10) Patent No.: US 10,461,957 B2
(45) Date of Patent: Oct. 29, 2019

(54) SYSTEM AND METHOD FOR SUPPORTING BOTH BULK STORAGE AND ETHERNET COMMUNICATIONS

(71) Applicant: China Unionpay Co., Ltd., Shanghai (CN)

(72) Inventors: Zhijun Lu, Shanghai (CN); Hongwen Meng, Shanghai (CN); Yu Zhou, Shanghai (CN); Wei Guo, Shanghai (CN); Chengqian Chen, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 1529 days.

(21) Appl. No.: 14/346,314

(22) PCT Filed: Sep. 24, 2012

(86) PCT No.: PCT/CN2012/081829
§ 371 (c)(1),
(2) Date: Jun. 24, 2014

(87) PCT Pub. No.: WO2013/041060
PCT Pub. Date: Mar. 28, 2013

(65) Prior Publication Data
US 2014/0355618 A1    Dec. 4, 2014

(30) Foreign Application Priority Data

Sep. 22, 2011    (CN) .......................... 2011 1 0283954

(51) Int. Cl.
*H04L 12/46* (2006.01)
*G06F 13/38* (2006.01)

(52) U.S. Cl.
CPC ............ *H04L 12/46* (2013.01); *G06F 13/385* (2013.01); *G06F 13/387* (2013.01); *H04L 12/462* (2013.01); *G06F 2213/3804* (2013.01)

(58) Field of Classification Search
CPC .................. G06F 13/385; G06F 13/387; G06F 2213/3804; H04L 12/46; H04L 12/462
See application file for complete search history.

(56) References Cited

U.S. PATENT DOCUMENTS

2005/0197017 A1    9/2005    Chou et al.
2005/0251593 A1    11/2005   Lin et al.
(Continued)

FOREIGN PATENT DOCUMENTS

CN    1685328 A    10/2005
CN    101034431 A   9/2007
(Continued)

*Primary Examiner* — Andrew Lai
*Assistant Examiner* — M Mostazir Rahman
(74) *Attorney, Agent, or Firm* — Womble Bond Dickinson (US) LLP

(57) ABSTRACT

The invention provides a master MMC/SD apparatus for simultaneously supporting bulk storage and Ethernet communication, a slave MMC/SD apparatus for simultaneously supporting bulk storage and Ethernet communication, a system composed of these two apparatuses as well as a method of operating the system. The apparatuses, system and method which simultaneously support bulk storage and Ethernet communication and which are based on MMC/SD interface enable a master apparatus with MMC/SD interface to support network function while maintaining bulk storage function as well, thus greatly expanding applicable areas of such embedded terminal apparatus with the MMC/SD interface that has bulk storage function.

25 Claims, 6 Drawing Sheets

(56) References Cited

U.S. PATENT DOCUMENTS

| | | | |
|---|---|---|---|
| 2007/0083924 A1* | 4/2007 | Lu | H04L 63/0227 726/13 |
| 2007/0210174 A1 | 9/2007 | Deprun et al. | |
| 2008/0059668 A1* | 3/2008 | Charrat | G06F 13/4243 710/110 |
| 2009/0300223 A1 | 12/2009 | Chiang et al. | |
| 2010/0049878 A1 | 2/2010 | Yu et al. | |
| 2010/0197347 A1* | 8/2010 | Lee | G06F 9/445 455/558 |
| 2011/0016267 A1* | 1/2011 | Lee | G06F 13/28 711/103 |
| 2012/0015637 A1* | 1/2012 | Mann | H04M 1/72519 455/414.1 |
| 2012/0242701 A1* | 9/2012 | Ingrassia, Jr. | G09G 5/00 345/649 |

FOREIGN PATENT DOCUMENTS

| | | |
|---|---|---|
| CN | 101895572 A | 11/2010 |
| CN | 102105845 A | 6/2011 |

\* cited by examiner

SYSTEM AND METHOD FOR SUPPORTING BOTH BULK STORAGE AND ETHERNET COMMUNICATIONS

FIELD OF THE INVENTION

The present invention generally relates to Ethernet communication, and in particular, to a system and method which simultaneously support bulk storage and Ethernet communication and which is based on MMC/SD (Multimedia Memory Card/Secure Digital) interface.

BACKGROUND

With social development, user's demand on storing data in embedded terminals such as cell phone, laptop computer has been increasingly growing. However, for reasons of cost, etc., it is not possible for embedded terminals to provide a storage space which fits demands of all users. In practice, small scale storage media such as MMC/SD storage card, Micro-SD storage card and Mini-SD storage card are usually used to provide expanded data space. Currently, it is already very common in embedded system field to use a MMC/SD interface to expand user-available storage space in those terminals. FIG. 1 shows a typical bulk storage structure model which is based on MMC/SD interface. The model comprises at least one master MMC/SD apparatus 101 and at least one slave MMC/SD apparatus 102 which are connected to each other via MMC/SD interface. As shown in FIG. 1, the master MMC/SD apparatus 101 comprises a master controller 103, a master bulk storage device 105, a master MMC/SD interface drive device 107 and a master MMC/SD interface, whereas the slave MMC/SD apparatus 102 comprises a slave controller 104, a slave bulk storage device 106, a slave MMC/SD interface drive device 108 and a slave MMC/SD interface. The master controller 103 uses the master bulk storage device 105 to provide file system service as well as management service for slave apparatus to store data, while the master MMC/SD interface drive device 107 is used to achieve transfer of MMC/SD signaling over MMC/SD interface. Similarly, the slave controller 104 is designed to control operation of the slave bulk storage device 106 and the slave MMC/SD interface drive device 108, and the slave controller 104 provides data storage service through the slave bulk storage device 106. The master apparatus and the slave apparatus may also comprise various general purpose or dedicated purpose peripheral devices (not shown in FIG. 1).

TCP/IP protocol based Ethernet is currently the most widely used local area network technology. Since Ethernet platform technology makes it easy to expand, simple for maintenance and convenient to build network, this technology has also continually extended into other embedded system fields. In embedded system fields, the physical layer interface of Ethernet mainly takes the form of PCI network card, USB card and optical fiber card, etc. Currently, MMC/SD interface can also be used as physical layer interface of Ethernet. FIG. 2 shows an Ethernet communication model which is based on MMC/SD interface in the prior art. The model also comprises at least one master MMC/SD apparatus 201 and at least one slave MMC/SD apparatus 202 which are connected to each other via MMC/SD interface. Unlike the bulk storage structure model shown in FIG. 1, the master MMC/SD apparatus 201 comprises a master communication protocol stack device 205 and does not comprise master bulk storage device. Similarly, the slave MMC/SD apparatus 202 comprises a slave communication protocol stack device 206 and does not comprise master bulk storage device. Both the master MMC/SD apparatus 201 and the slave MMC/SD apparatus 202 may comprise various general purpose or dedicated purpose peripheral devices. MMC/SD interface-based Ethernet communication system aims to expand network applicability of embedded terminal apparatus without changing hardware structure thereof.

However, MMC/SD interface-based embedded terminal apparatus in the prior art either solely supports a master bulk storage device, or solely supports a master communication protocol stack device. That is, if the users intends that the embedded terminal apparatus simultaneously supports bulk storage device and Ethernet communication, it is necessary that at least two MMC/SD interfaces be provided in the embedded terminal apparatus, and the user also has to hold at least two slave MMC/SD apparatus, i.e., one supports master bulk storage device only and the other supports master communication protocol stack device only. As a result, manufacture cost of embedded terminal apparatus is increased and many inconveniences have also been brought to user's operation.

Therefore, there remains a need for a MMC/SD interface-based system which simultaneously supports bulk storage and Ethernet communication.

SUMMARY OF THE INVENTION

It is an object of the invention to provide a MMC/SD interface-based system which simultaneously supports bulk storage and Ethernet communication as well as a method suited for the system, so that users can conveniently perform bulk data storage and Ethernet communication at the same time on an embedded terminal apparatus having a MMC/SD interface, while also simplifying structure of existing terminals and reducing manufacture cost.

In order to achieve the above object, the invention provides a master MMC/SD apparatus for simultaneously supporting bulk storage and Ethernet communication, comprising: a master MMC/SD interface for providing access interface to a slave MMC/SD apparatus; a master MMC/SD interface drive device for controlling transfer of MMC/SD signaling over the master MMC/SD interface; a master bulk storage device for providing file system service and data management service for bulk storage; a master communication protocol stack device for achieving Ethernet communication between the master MMC/SD apparatus and the slave MMC/SD apparatus; and a master controller for controlling operations of the master MMC/SD interface drive device, the master bulk storage device and the master communication protocol stack device; wherein the master bulk storage device and the master communication protocol stack device interact with the master MMC/SD interface drive device respectively.

According to an embodiment of the invention, the master bulk storage device and the master communication protocol stack device may be arranged to access physical addresses that are independent from each other in the slave MMC/SD apparatus.

According to an embodiment of the invention, the operations performed on the master MMC/SD interface drive device by the master bulk storage device and the master communication protocol stack device are atomic operations.

According to an embodiment of the invention, the master controller can be used to send a probe command to the slave MMC/SD apparatus through the master communication protocol stack device and determines whether the slave MMC/SD apparatus supports Ethernet communication according to a command return value.

According to an embodiment of the invention, the master communication protocol stack device may comprise the following modules arranged sequentially from top to bottom: an application layer module for executing network application programs; a transmission layer module and a network layer module for executing Ethernet protocol function; a data link layer module for packing Ethernet data frame; a MMC/SD EEM (Ethernet Emulation Model) layer module for emulating Ethernet card function for upper layer protocol stack; and a MMC/SD protocol layer module for executing MMC/SD protocol stack.

According to an embodiment of the invention, the MMC/SD EEM layer module may transmit data in EEM packet format, wherein the EEM packet may be composed of an EEM header field and an EEM payload field. The EEM header field may comprise a first field and a second field, and the first field may be used to define the type of the EEM packet.

According to an embodiment of the invention, when the EEM packet is a data packet, the second field may comprise a check status field and a length field, wherein the length field can be used to indicate the length of the payload field in the EEM data packet, and the check status field is used to indicate whether CRC check of Ethernet data frame is on or off.

According to an embodiment of the invention, when the EEM packet is a command packet, the second field may comprise a command type field and a command parameter field, wherein the command type field can be used to define the type of EEM command, and the command parameter field can be used to define parameters of EEM command.

According to an embodiment of the invention, the MMC/SD protocol layer module can use MMC/SD data block to carry the EEM packet in one of the following manners: one MMC/SD data block contains one EEM packet; one MMC/SD data block contains a plurality of EEM packets; a plurality of MMC/SD data blocks contain one EEM packet; and a plurality of MMC/SD data blocks contain a plurality of separate EEM packets.

According to an embodiment of the invention, the master MMC/SD interface can be a Mini-SD master interface, a Micro-SD master interface or a standard MMC/SD master interface.

The invention also provides a slave MMC/SD apparatus for simultaneously supporting bulk storage and Ethernet communication, comprising: a slave MMC/SD interface for providing access interface to a master MMC/SD apparatus; a slave MMC/SD interface drive device for controlling transfer of MMC/SD signaling over the slave MMC/SD interface; a slave bulk storage device providing corresponding file system service and data management service for bulk storage of the master MMC/SD apparatus; a slave communication protocol stack device for achieving Ethernet communication between the slave MMC/SD apparatus and the master MMC/SD apparatus; and a slave controller for controlling operations of the slave MMC/SD interface drive device, the slave bulk storage device and the slave communication protocol stack device; wherein the slave bulk storage device and the slave communication protocol stack device interact with the slave MMC/SD interface drive device respectively.

According to an embodiment of the invention, special address information can be contained in the file system of the slave bulk storage device so that the slave MMC/SD interface drive device can provide two physical passages that are independent from each other.

According to an embodiment of the invention, the special address information can be provided in a reserved sector after the main boot sector of the file system of the slave bulk storage device.

According to an embodiment of the invention, the special address information can be also provided in a reserved sector after the boot sector of each partition of the file system of the slave bulk storage device.

According to an embodiment of the invention, it is also possible to provide an index for the special address information in a reserved sector after the main boot sector of the file system of the slave bulk storage device.

According to an embodiment of the invention, the length of the special address information is 512 bytes.

According to an embodiment of the invention, the slave controller can be arranged to determine whether data received from the slave MMC/SD interface is used for bulk storage or for Ethernet communication according to whether the data is sent to the special address.

According to an embodiment of the invention, the slave communication protocol stack device may comprise the following modules arranged sequentially from top to bottom: an application layer module for executing network application programs; a transmission layer module and a network layer module for executing Ethernet protocol function; a data link layer module for packing Ethernet data frame; a MMC/SD EEM (Ethernet Emulation Model) layer module for emulating Ethernet card function for upper layer protocol stack; and a MMC/SD protocol layer module for executing MMC/SD protocol stack.

According to an embodiment of the invention, the MMC/SD EEM layer module may transmit data in EEM packet format, wherein the EEM packet may be composed of an EEM header field and an EEM payload field. The EEM header field may comprise a first field and a second field, and the first field may be used to define the type of the EEM packet.

According to an embodiment of the invention, when the EEM packet is a data packet, the second field may comprise a check status field and a length field, wherein the length field can be used to indicate the length of the payload field in the EEM data packet, and the check status field is used to indicate whether CRC check of Ethernet data frame is on or off.

According to an embodiment of the invention, when the EEM packet is a command packet, the second field may comprise a command type field and a command parameter field, wherein the command type field can be used to define the type of EEM command, and the command parameter field can be used to define parameters of EEM command.

According to an embodiment of the invention, the MMC/SD protocol layer module can use MMC/SD data block to carry the EEM packet in one of the following manners: one MMC/SD data block contains one EEM packet; one MMC/SD data block contains a plurality of EEM packets; a plurality of MMC/SD data blocks contain one EEM packet; and a plurality of MMC/SD data blocks contain a plurality of separate EEM packets.

According to an embodiment of the invention, the slave MMC/SD interface can be a Mini-SD slave interface, a Micro-SD slave interface or a standard MMC/SD slave interface.

The invention also provides a system for simultaneously supporting bulk storage and Ethernet communication, the system comprising any of the above master MMC/SD apparatuses and any of the above slave MMC/SD apparatuses, wherein the master MMC/SD apparatus and the slave MMC/SD apparatus perform both bulk storage and Ethernet communication via the same MMC/SD interface.

According to an embodiment of the invention, the Ethernet communication between the master MMC/SD apparatus and the slave MMC/SD apparatus may employ a request-response mechanism, wherein a request command and a response command are both read from the same special address in the slave MMC/SD apparatus.

According to an embodiment of the invention, when Ethernet communication is being performed, the master MMC/SD apparatus can be arranged to poll the slave MMC/SD apparatus periodically so as to receive data from the slave MMC/SD apparatus.

According to an embodiment of the invention, the master MMC/SD apparatus can be a cell-phone, PDA, laptop computer, POS machine or ATM with a MMC/SD master interface.

The invention also provides a method for simultaneously supporting bulk storage and Ethernet communication between a master MMC/SD apparatus and a slave MMC/SD apparatus, wherein the master MMC/SD apparatus is the master MMC/SD apparatus provided by the invention, the method comprising the following steps: a. when the master MMC/SD apparatus detects that a slave MMC/SD apparatus is connected thereto, the master MMC/SD apparatus reads a specific location in the file system of the slave MMC/SD apparatus to obtain special address information; b. the master MMC/SD apparatus sends a probe command to the special address and determines whether the slave MMC/SD apparatus is the slave MMC/SD apparatus provided by the invention according to a command return value; c. if not, the master MMC/SD apparatus restores a previously stored special address information and executes a standard MMC/SD storage procedure; otherwise, the master MMC/SD apparatus loads a master communication protocol stack device and sends data to the slave MMC/SD apparatus; d. the slave MMC/SD apparatus determines whether the data is used for bulk storage or for Ethernet communication according to whether the data is sent to the special address; e. if the data is sent to the special address, Ethernet communication is performed between the slave MMC/SD apparatus and the master MMC/SD apparatus; otherwise, the slave MMC/SD apparatus and the master MMC/SD apparatus perform a standard MMC/SD storage procedure together.

The invention provides a master MMC/SD apparatus for simultaneously supporting bulk storage and Ethernet communication, a corresponding slave MMC/SD apparatus, a system composed of these two apparatuses as well as a method of operating the system. The apparatuses, system and method which simultaneously support bulk storage and Ethernet communication and which are based on MMC/SD interface enable a master apparatus with MMC/SD interface to support network function while maintaining bulk storage function as well, thereby greatly expanding applicable areas of such embedded terminal apparatus based on the MMC/SD interface that has bulk storage function.

The method of the invention will be described hereinafter in connection with particular embodiments.

BRIEF DESCRIPTION OF THE DRAWINGS

The above and other objects, characteristics and advantages of the invention will become apparent from the following more specific description of the embodiments of the invention which are shown schematically in the accompanying drawings, in which.

DETAILED DESCRIPTION OF THE INVENTION

Figure 1:
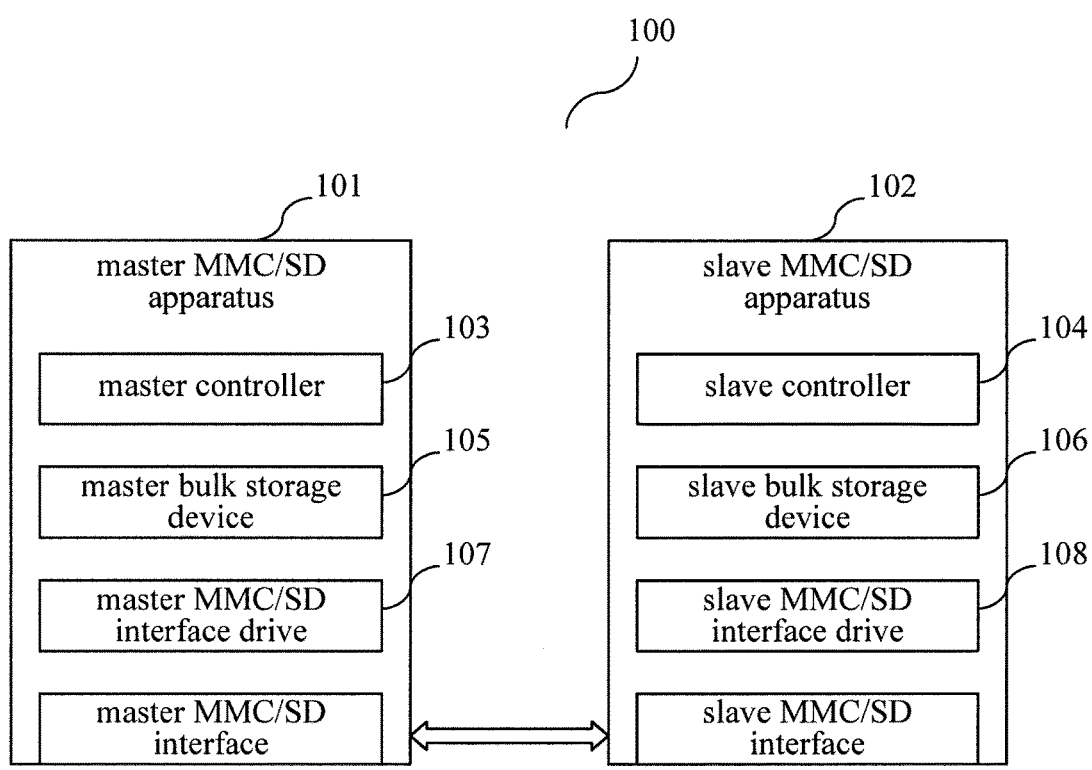
FIG. 1 is a MMC/SD interface-based bulk storage structure model in the prior art.
Figure 2:
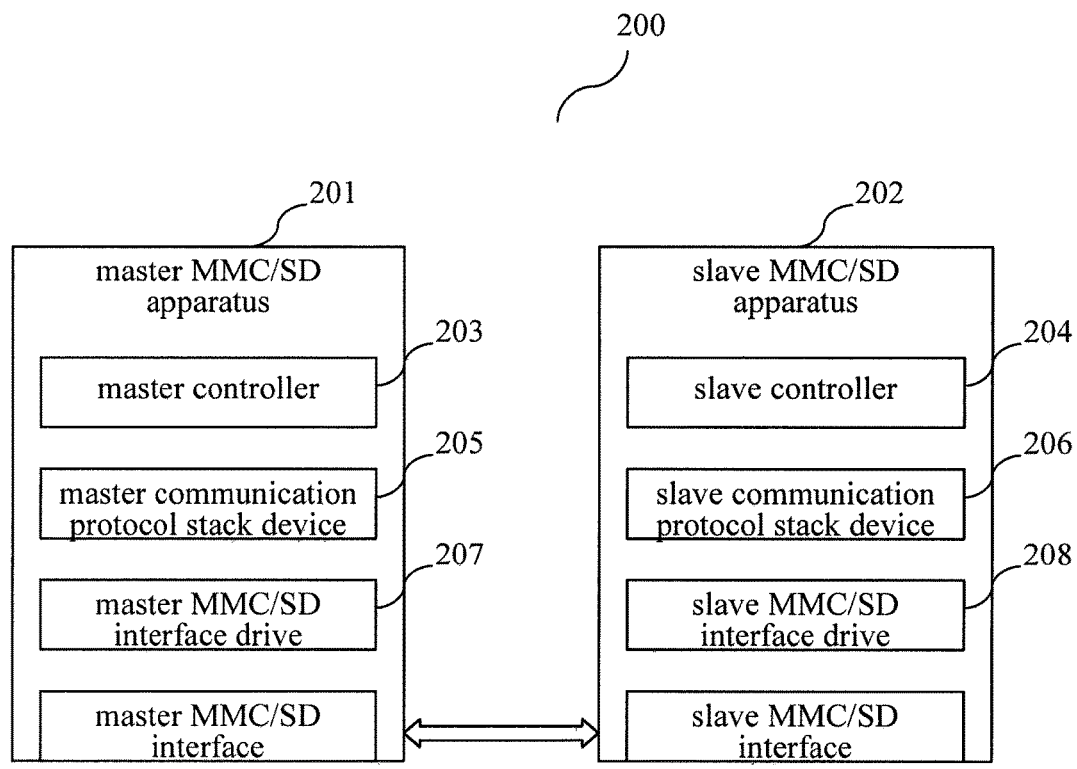
FIG. 2 is a MMC/SD interface-based Ethernet communication model in the prior art.

The invention will be further described in detail hereinafter with reference to the accompanying drawings and particular embodiments. It is noted that the structures in the drawings are merely illustrative so that those with ordinary skills in the art will best understand the principle of the invention, and these structures are not necessarily drawn to scale.

Figure 3:
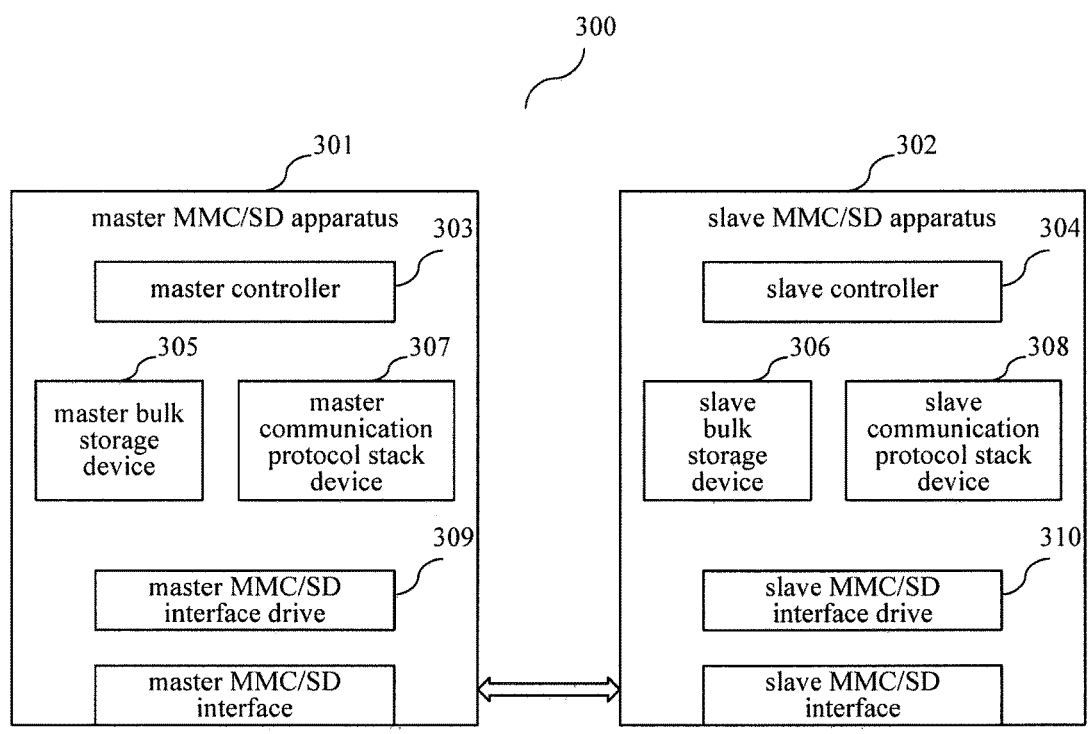
FIG. 3 is a schematic view of a system which is based on MMC/SD interface and which simultaneously supports bulk storage and Ethernet communication according to the present invention.

FIG. 3 is a schematic view of a system 300 which is based on MMC/SD interface and which supporting bulk storage and Ethernet communication according to the present invention. As shown in FIG. 3, the system 300 comprises at least one master MMC/SD apparatus 301 for simultaneously supporting bulk storage and Ethernet communication and at least one slave MMC/SD apparatus 302 for simultaneously supporting bulk storage and Ethernet communication, which are provided by the invention and can be connected to each other via a MMC/SD interface. The MMC/SD interface can be a Mini-SD interface, a Micro-SD interface, a standard MMC/SD interface or any other interface which complies with MMC/SD interface protocol specification. The master MMC/SD apparatus 301 and the slave MMC/SD apparatus 302 may also comprise various general purpose or dedicated purpose peripheral devices (not shown in FIG. 3).

The master MMC/SD apparatus 301 of the invention comprises a master controller 303, a master bulk storage device 305, a master communication protocol stack device 307, a master MMC/SD interface drive device 309 and a master MMC/SD interface for providing access to the slave MMC/SD apparatus 302. Generally, the master controller 303 is used to control operations of the master bulk storage device 305, the master communication protocol stack device 307 and the master MMC/SD interface drive device 309. The master bulk storage device 305 is mainly used to provide file system service and data management service, which is similar to the function of master bulk storage device in existing master MMC/SD apparatus. The master communication protocol stack device 307 is used to achieve reception and transmission of Ethernet communication information between the master MMC/SD apparatus 301 and the slave MMC/SD apparatus 302. The structure of the master communication protocol stack device will be described in detail hereinafter with reference to FIG. 4. The master MMC/SD interface drive device 309 is mainly used to achieve transfer of MMC/SD signaling over the master MMC/SD interface.

Similarly, the slave MMC/SD apparatus 302 of the invention comprises a slave controller 304, a slave bulk storage device 306, a slave communication protocol stack device 308, a slave MMC/SD interface drive device 310 and a slave MMC/SD interface for providing access to the master MMC/SD apparatus 301. Similarly, the slave controller 304 is used to control operations of the slave bulk storage device 306, the slave communication protocol stack device 308 and the slave MMC/SD interface drive device 310. The slave bulk storage device 306 is mainly used to provide corresponding file system service and data management service for bulk storage between the master MMC/SD apparatus 301 and the slave bulk storage device 306, which is similar to the function of slave bulk storage device in existing slave MMC/SD apparatus. The slave communication protocol stack device 308 has completely the same protocol stack structure as the master communication protocol stack device which will be described in detail hereinafter with reference to FIG. 4. The slave MMC/SD interface drive device 310 is used to achieve transfer of MMC/SD signaling over the slave MMC/SD interface.

Figure 4:
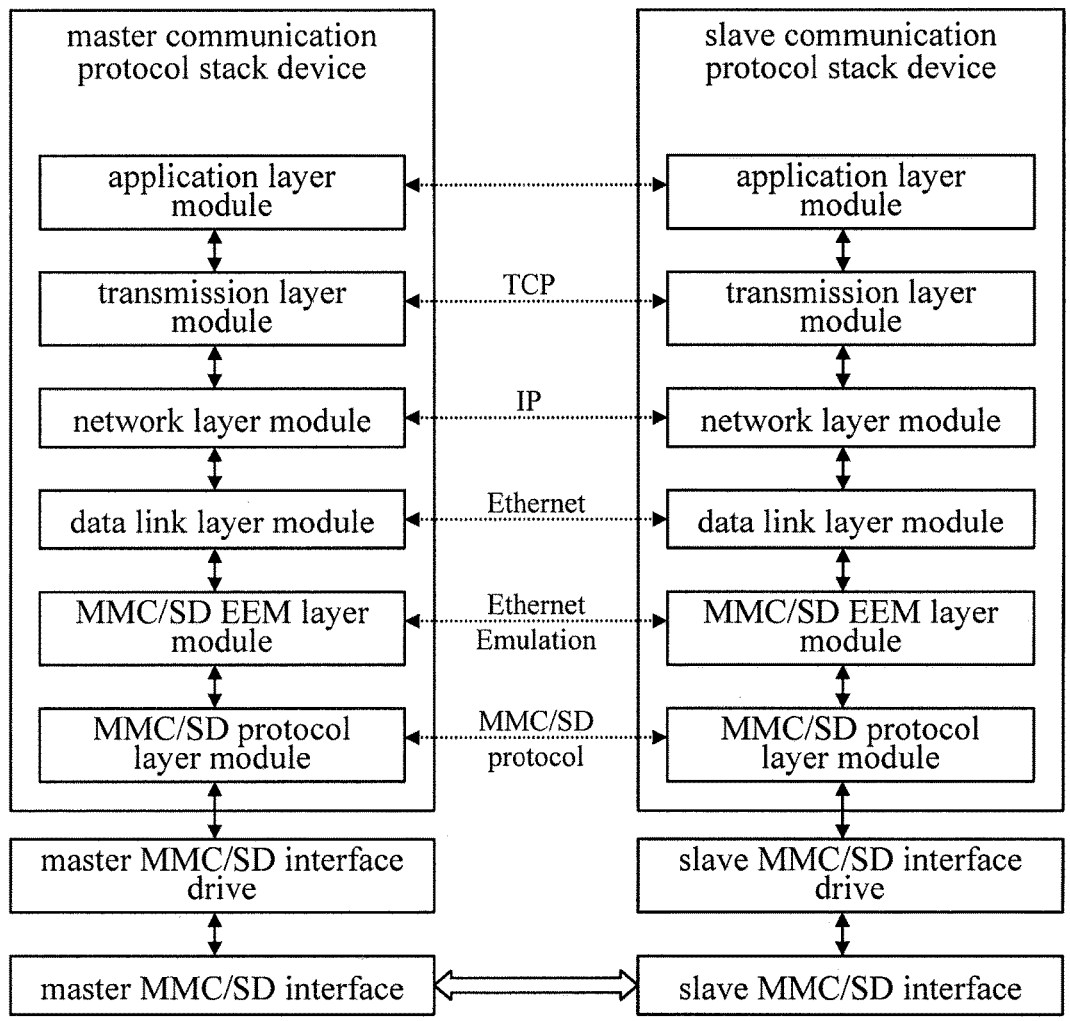
FIG. 4 shows an exemplary structure of a communication protocol stack for the apparatus which is based on MMC/SD interface and which simultaneously supports bulk storage and Ethernet communication according to the present invention.

FIG. 4 shows an exemplary structure of a communication protocol stack for the apparatus which is based on MMC/SD interface and which simultaneously supporting bulk storage and Ethernet communication according to the present invention. As shown in FIG. 4, the master communication protocol stack device has completely the same protocol stack structure as the slave communication protocol stack device, and identical layers in the master MMC/SD apparatus 301 and the slave MMC/SD apparatus 302 correspond to each other, which is similar to the relevance between two apparatuses which are generally based on Ethernet communication. By way of example, such communication protocol stack may comprise an application layer module, a transmission layer module, a network layer module, a data link layer module, a MMC/SD EEM (Ethernet Emulation Model) layer module and a MMC/SD protocol layer module. Specifically, the application layer module is mainly used for executing network application programs such as TFTP, HTTP, etc.; the transmission layer module and the network layer module are used for executing Ethernet protocol functions, such as TCP/IP, etc.; and the data link layer module is used for executing packing of Ethernet data frame. The MMC/SD EEM layer module is used to emulate function of Ethernet card for upper layer protocol stack, and the MMC/SD protocol layer module is used to execute function of MMC/SD protocol stack, realizing various MMC/SD commands supported by the protocol stack. Those skilled in the art will understand that the master communication protocol stack device 307 and the slave communication protocol stack device 308 are not limited to the layering structure shown in FIG. 4. In practice, several relevant layers can be integrated according to different requirements. For example, the transmission layer module and the network layer module can be integrated. Moreover, the MMC/SD protocol layer module may be integrated with the master or slave MMC/SD interface drive device as required.

According to the structure of the communication protocol stack device shown in FIG. 4, when the master or slave MMC/SD apparatus sends data, the data stream is transmitted from top to bottom and layer by layer, starting from the application layer, for example, and is send out from the MMC/SD interface; when the slave or master MMC/SD apparatus receives data, data to be received is retrieved from the MMC/SD interface and is transmitted from bottom to top and layer by layer. It is understood by those skilled in the art that the data stream does not necessarily starts from the application layer; rather, it can start from certain intermediate layer depending on different requirements, such as from the MMC/SD EEM layer. Moreover, the data stream also does not necessarily pass through every layer in sequence; rather, it can skip some layers. It can be substantially seen from FIG. 4 that the layers above the MMC/SD EEM layer are consistent with TCP/IP network model, and therefore, the data transmission format thereof may follow TCP/IP protocol stack. By way of example, the data format of network layer may be IP packet, and the data format of data link layer may be Ethernet data frame. Comparatively, the layers under the MMC/SD EEM layer are consistent with MMC/SD protocol model, and data packets generated from the MMC/SD EEM layer follow the format of data transmitted over the MMC/SD interface as provided under MMC/SD protocol. The MMC/SD EEM layer itself is used for achieving connection between the upper portion and the lower portion and it may use EEM packet format to transmit data upward or downward.

Figure 5:
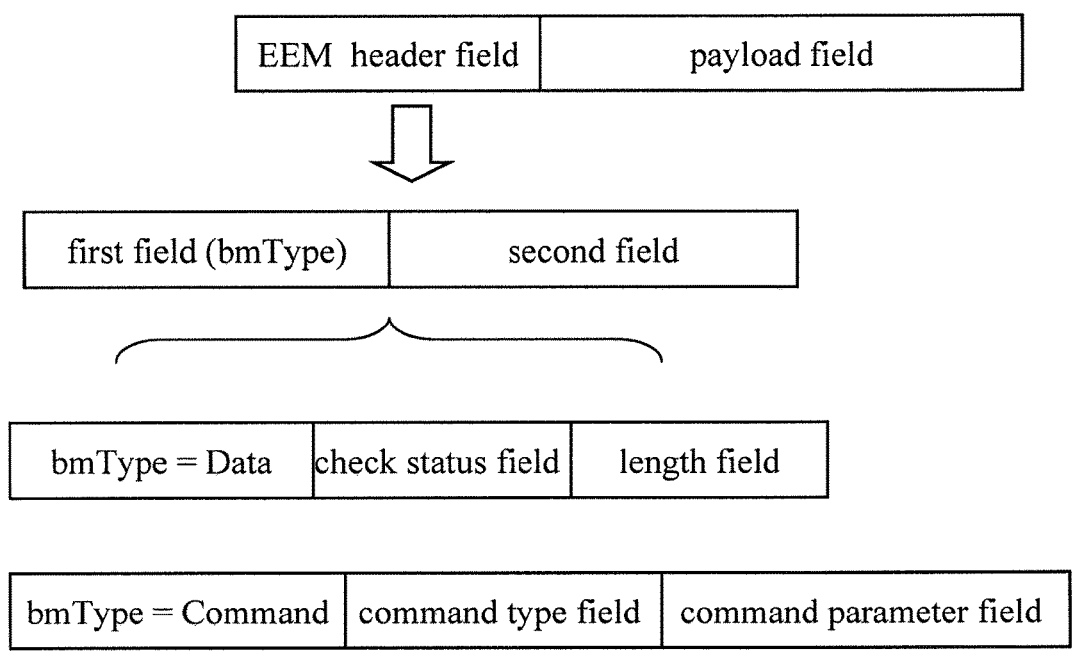
FIG. 5 shows an exemplary construction of an EEM packet for the apparatus which is based on MMC/SD interface and which simultaneously supports bulk storage and Ethernet communication according to the present invention.

FIG. 5 shows an exemplary construction of an EEM packet for the apparatus which is based on MMC/SD interface and which simultaneously supporting both bulk storage and Ethernet communication according to the present invention. As shown in FIG. 5, the EEM packet may be composed of an EEM header field and a payload field (e.g., Ethernet data frame), for example. In some embodiments, the EEM packet's header field may comprise a first field (bmType) and a second field. The first filed may be used to define the type of the EEM packet, i.e., to indicate whether the EEM is a data packet or a command packet, whereas the second filed may have different structures depending on different types of EEM packet.

In some embodiments, when the EEM packet is a data packet for carrying Ethernet data frame, the first field bmType=Data, i.e., it means that the EEM packet is used for transmitting network data. Therefore, the second field of the EMM packet header may for example comprise a check status field and a length field, wherein the check status field (bmCRC) may be used to indicate whether CRC check of Ethernet data frame is on or off, and the length field may be used to indicate the length of the payload in the EEM packet, i.e., the length of the Ethernet data frame.

In some embodiments, when the EEM packet is a command packet for controlling Ethernet communication, the first field bmType=Command, i.e., it means that the EEM packet is used for transmitting Ethernet communication control commands. Therefore, the second field of the EMM packet header may for example comprise a command type field and a command parameter field, wherein the command type field (bmCMD) can be used to indicate the type of EEM command, and the command parameter field (bmPara) can be used to set parameters of the command. The EEM commands can be built directly from MMC/SD EEM layer module and has no direct relationship with the application layer or network protocol stack, mainly for network interface control.

In some embodiments, Ethernet communication between the master MMC/SD apparatus 301 and the slave MMC/SD apparatus 302 may employ a request-command mechanism. That is, the master apparatus sends a request command to the slave apparatus to instruct an operation of the slave apparatus, and the slave apparatus returns a corresponding response command after completion of the operation. The above EEM command packet can be used to achieve such request-response mechanism so as to build Ethernet communication connection between the master MMC/SD apparatus 301 and the slave MMC/SD apparatus 302, terminate the Ethernet communication connection, and check the status of the Ethernet communication connection, etc. To this end, the command type field in the header field of an EEM command packet may be used to indicate the following command types, for example:

Probe command, which is used by the master MMC/SD apparatus to verify whether the slave MMC/SD apparatus supports Ethernet communication, wherein after the master MMC/SD apparatus sends a Probe command to the slave MMC/SD apparatus, the master MMC/SD apparatus determines whether the slave MMC/SD apparatus supports Ethernet communication based on whether the slave MMC/SD apparatus returns a ProbeResponse command;

ProbeResponse command, which is used by the slave MMC/SD apparatus to respond to the Probe command sent from the master MMC/SD apparatus;

Stop command, which is used by the master MMC/SD apparatus to turn off Ethernet communication function of the slave MMC/SD apparatus;

StopResponse command, which is used by the slave MMC/SD apparatus to respond to the Stop command sent from the master MMC/SD apparatus;

WakeUp command, which is used by the master MMC/SD apparatus to restart Ethernet communication function of the slave MMC/SD apparatus;

WakeupResponse command, which is used by the slave MMC/SD apparatus to respond to the WakeUp command sent from the master MMC/SD apparatus;

Echo command, which is used to verity the validity of Ethernet communication connection, wherein both the master MMC/SD apparatus and the slave MMC/SD apparatus can use the Echo command; when any of the apparatuses receives the Echo command, it is required to use data in the payload field of the command to send EchoResponse command;

EchoResponse command, which is used by the master MMC/SD apparatus or the slave MMC/SD apparatus to respond to the corresponding Echo command;

ResponseHint command, which is used by the slave MMC/SD apparatus to set a minimum time interval for stopping the inquiry when the master MMC/SD apparatus stops inquiring about data from the slave MMC/SD apparatus, wherein the master MMC/SD apparatus can ignore this command;

ResponseCompleteHint command, which is used by the slave MMC/SD apparatus to inform the master MMC/SD apparatus that there is no data to be sent out currently, when the master MMC/SD apparatus receives this command, it can stop inquiring until itself has data to be sent out or a specified time is reached, wherein the master MMC/SD apparatus can also ignore this command; when the specified time is reached while the master MMC/SD apparatus has no data to be sent out, the master MMC/SD apparatus can send a Tickle command to the slave MMC/SD apparatus; however, since the master MMC/SD apparatus can ignore the ResponseCompleteHint command, the slave MMC/SD apparatus does not necessarily receive the Tickle command when the specified time is reached;

Tickle command, which is used by the master MMC/SD apparatus to inform the slave MMC/SD apparatus that the specified time for the ResponseCompleteHint command is reached; since the master MMC/SD apparatus can ignore the ResponseCompleteHint command, the slave MMC/SD apparatus does not necessarily receive the Tickle command when the specified time is reached.

It is understood by those skilled in the art that apart from the above command types, the command set can be expanded correspondingly as required, thus improving the Ethernet communication functions between the master MMC/SD apparatus and the slave MMC/SD apparatus.

It can be known from the structure of the communication protocol stack device shown in FIG. 4 that the EEM packets generated by the MMC/SD EEM layer will be sent to the MMC/SD protocol layer and the MMC/SD interface drive device and further sent out from the MMC/SD interface; or otherwise, the EEM packets can be received by the MMC/SD EEM layer from the MMC/SD protocol layer and the MMC/SD interface drive device, and further transmitted upward after being processed or unpacked locally at the MMC/SD layer. Existing MMC/SD protocol specifies that data is transmitted over MMC/SD interface in the unit of block, with each block being 2n times of 512 bytes, while RFC 894 specification provides that the size of Ethernet data frame is 64-1518 bytes. Therefore, taking block size of BLOCK_LEN (e.g., 512 bytes) for example, if the length of EEM packet that needs be to sent or received is within BLOCK_LEN, the MMC/SD EEM layer can call single block read/write command (CMD17/CMD24) of the MMC/SD protocol layer and conduct transmission or reception through the MMC/SD interface controlled by the MMC/SD interface drive device; if the length of EEM packet is larger than BLOCK_LEN, the MMC/SD EEM layer can use multiple blocks read/write command (CMD18/CMD25) of the MMC/SD protocol layer. If there is gap between packets, the gap can be filled by any characters that have no influence on unpacking (e.g., 0x0). By way of example, the MMC/SD data blocks can carry the EEM packets in the following manners: one MMC/SD data block contains one EEM packet; one MMC/SD data block contains a plurality of EEM packets; a plurality of MMC/SD data blocks contain one EEM packet; and a plurality of MMC/SD data blocks contain a plurality of separate EEM packets.

The process of performing Ethernet communication between the master MMC/SD apparatus 301 and the slave MMC/SD apparatus 302 using the communication protocol stack device shown in FIG. 4 will be described hereinafter. The process in which the master MMC/SD apparatus 301 transmits IP data packet to the slave MMC/SD apparatus 302 will be used as an example, and the process may comprise the following two sections:

a) at the transmitting end, the application layer data in the master MMC/SD apparatus 301 is processed by the transmission layer module and the network layer module in the master communication protocol stack device 307 and is then sent to the data link layer module after forming network layer IP data packet. The data link layer module packs the network layer IP data packet into Ethernet data frame which is then processed by the MMC/SD EEM layer module. The MMC/SD EEM layer module adds EEM header field to the received Ethernet data frame header and packs it into EEM data packet. Then, a single or multiple MMC/SD data block(s) is formed according to the size of the EEM packet(s) to be sent, command CMD24 (single block write command) or command CMD 25 (multiple blocks write command) in the MMC/SD protocol is called, and the MMC/SD data block(s) is sent out from the master MMC/SD interface via the MMC/SD protocol layer module and the master MMC/SD interface drive device.

b) at the receiving end, the slave MMC/SD apparatus 302 receives the single or multiple MMC/SD data block(s) via the slave MMC/SD interface and sends it to the MMC/SD EEM layer module; the MMC/SD EEM layer module acquires one or more EEM packets from the MMC/SD data block(s) and determines the type of EEM packet according to header field of the packet, i.e., whether it is a command packet or a data packet. If it is determined that the packet is an EEM command packet, it is directly processed by the module; if it is an EEM data packet, the EEM header field is removed in order to acquire the Ethernet data frame which is then processed by the data link layer module; the data link layer module acquires IP data packet from the Ethernet data frame and then sends it to the transmission layer module and the network layer module for processing. Finally, the application layer module processes relevant application layer data.

It is understood by those skilled in the art that the above IP data packet is merely one form of network layer data packet, which could also be ARP data packet, RARP data packet, etc. It is also possible that the data stream does not start from the application layer (e.g., a synchronous packet of TCP is built by the transmission layer).

Since MMC/SD interface-based transmission is a master-slave mode, i.e., transmission of all the data must be initiated by the master MMC/SD apparatus 301, it can be provided that for the case where network communication data is required to be transmitted from the slave MMC/SD apparatus 302 transmits to the master MMC/SD apparatus 301, the slave MMC/SD apparatus 302 puts the data blocks to be transmitted into a sending cache, waiting for the master apparatus to read. According to an embodiment of the invention, data transmission from the slave apparatus can be achieved in a manner that the master MMC/SD apparatus 301 polls the slave MMC/SD apparatus 302 periodically. This function can be achieved using the EEM command packet generated by the MMC/SD EEM layer module as described above. However, it is understood by those skilled in the art that the specific implementation is not restricted to some particular way; rather, any method that is able to achieve polling function can be used, such as timer, operation system service, core threads within the operation system and the like.

It can be seen from the above described process that the master MMC/SD apparatus 301 and the slave MMC/SD apparatus 302 can use the MMC/SD EEM layer module to conduct network communication, including using existing network application to conduct network communication. In addition, as long as one of the master MMC/SD apparatus 301 and the slave MMC/SD apparatus 302 is connected to another network (e.g., Internet), the other one can also be able to connect with this network as a network node.

Figure 6:
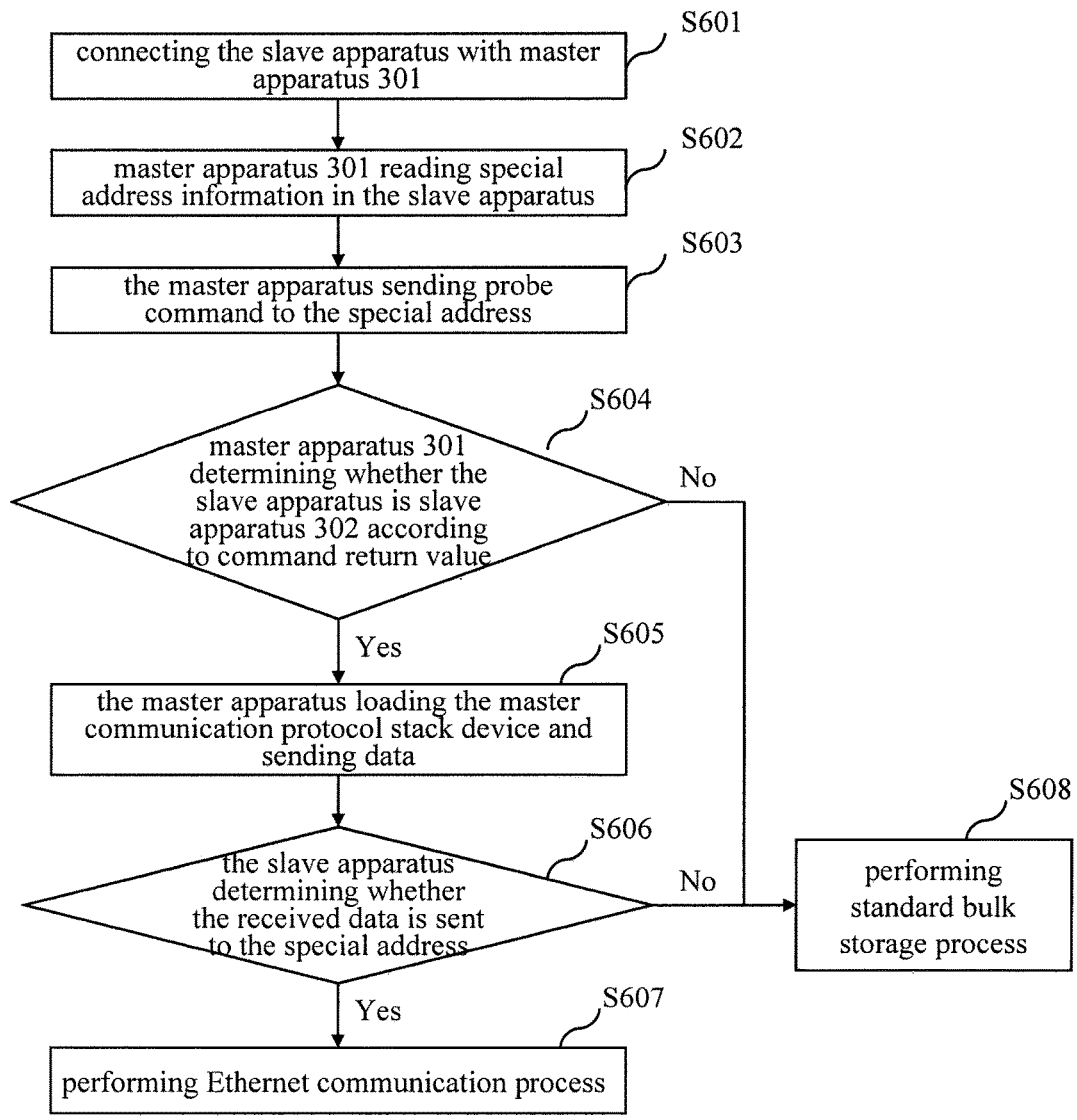
FIG. 6 shows a flowchart of a method which is based on MMC/SD interface and which simultaneously supports bulk storage and Ethernet communication according to the present invention.

FIG. 6 shows a flowchart of a method which is based on MMC/SD interface and which simultaneously supports bulk storage and Ethernet communication according to the present invention. The method process will be described hereinafter with reference to the master MMC/SD apparatus 301 and the slave MMC/SD apparatus 302 described in FIG. 3, and the characteristics and advantages of the master apparatus and slave apparatus of the invention which are based on MMC/SD interface and which simultaneously supporting bulk storage and Ethernet communication will be further described.

At step S601, the slave MMC/SD apparatus is connected to the master MMC/SD apparatus 301. Here, the slave MMC/SD apparatus is not necessarily the slave MMC/SD apparatus 302, and it could be any slave MMC/SD apparatus which has a slave MMC/SD interface that corresponds to the master MMC/SD apparatus 301. Therefore, the master MMC/SD apparatus 301 can detect that a slave apparatus is connected to its master MMC/SD interface. Typically, when it is detected that a slave apparatus is connected, the master MMC/SD apparatus 301 powers the slave apparatus. For example, for the slave MMC/SD apparatus 302, the slave MMC/SD interface drive device 310 may be powered. The slave apparatus then starts a power-up initialization and loading process for various modules. For example, the slave MMC/SD apparatus 302 may complete loading of the slave bulk storage device 306 and the slave communication protocol stack device 308. For the master MMC/SD apparatus 302 itself, it will also initialize and load corresponding modules, including partial functions of the master bulk storage device 305 and the master communication protocol stack device 307.

At step S602, the master controller 303 of the master MMC/SD apparatus 301 will read special address information in the slave apparatus via the master bulk storage device 305 and save the information. The master MMC/SD apparatus 301 can be arranged to read a fixed location in the file system of the slave apparatus and save the data read from this location as a physical address (regardless of whether it actually represents address information or not). Then, at step S603, the master MMC/SD apparatus 301 will send a probe command to this address which the master MMC/SD apparatus assumes it is and determine whether the slave apparatus is the slave MMC/SD apparatus 302 according to a command response value sent back from the slave apparatus. This process will be described in detail hereinafter.

It is known that the MMC/SD protocol provides that the parameter in read/write block command (single block read/write command CMD17/CMD24 or multiple blocks read/write command CMD18/CMD25) must contain a beginning address of the read/write block. In order that the master bulk storage device 305 and the master communication protocol stack device 307 in the master MMC/SD apparatus 301 can operate simultaneously and do not interfere with each other, the slave MMC/SD interface is required to provide two physical passages that do not affect each other. That is, the address space in the slave MMC/SD apparatus accessed by the master bulk storage device 305 and the address space in the slave MMC/SD apparatus accessed by the master communication protocol stack device 307 are different and independent from each other. Therefore, in order to obtain such physical address spaces that are independent from each other, in addition to the common addresses for bulk storage, one special address can be set in the slave MMC/SD apparatus of the invention to serve as the beginning address for Ethernet communication.

For the slave MMC/SD apparatus 302 of the invention, information that is related to this special address can be provided in advance in a reserved sector after the main boot sector of the file system of the slave bulk storage device 306, wherein the main boot sector can be the first sector at the beginning of the whole storage device, for example, the cylinder 0, head 0, sector 1 of a PC hard disk. Generally, the special address information is the content of one sector, with the size of 512 bytes. When there are a plurality of partitions in the slave bulk storage device 306, the special address information can be provided in a boot sector of each partition, i.e., a reserved sector after the sector of each partition which starts to store global parameter information. Such file system could be FAT16/32, NTFS or exFAT. In this case, different reserved sectors can be used for each partition. In addition, it is also possible to provide an index for the special address information in a reserved sector after the main boot sector of the file system of the slave bulk storage device. It is understood by those skilled in the art that acquisition of the special address information is not merely limited to these methods. Any other methods can be used as long as the address space in the slave MMC/SD apparatus accessed by the master bulk storage device 305 and the address space in the slave MMC/SD apparatus accessed by the master communication protocol stack device 307 are independent from each other.

In practice, the master MMC/SD apparatus 301 can firstly use the above described special address information to determine whether the request-response mechanism for Ethernet communication as described above can be achieved together with the slave apparatus connected thereto, thereby building Ethernet communication connection. By way of example, the master MMC/SD apparatus 301 can access the reserved sector after the main boot sector of the file system of the slave bulk storage device 306 at step S602 according to the previous settings, reading the content in this sector and saving it as a special address for Ethernet communication. Then, at step S603, the master MMC/SD apparatus 301 can generate an EEM command packet, in which the above described Probe command is included as the probe command, and the special address is included in the MMC/SD write command. The master MMC/SD apparatus 301 sends the probe command to the slave apparatus and then sends a MMC/SD read command to the special address after a predetermined time period has elapsed. Whether the connected slave apparatus is a common MMC/SD slave apparatus or the slave MMC/SD apparatus 302 of the invention is determined by determining whether the content read from the special address is a ProbeResponse command. For a common MMC/SD slave apparatus, no special address for Ethernet communication will be provided in the reserved sector, and no ProbeResponse command will be sent back in response to the Probe command.

At step S604, if the master MMC/SD apparatus 301 determines that the slave apparatus connected thereto is a common slave MMC/SD apparatus such as a MMC/SD storage card, rather than the slave MMC/SD apparatus 302, the master MMC/SD apparatus 301 no longer loads the complete master communication protocol stack device 307; rather, it performs a standard MMC/SD bulk storage process, which pertains to the prior art and is therefore not discussed repeatedly.

If the master MMC/SD apparatus 301 determines at step S604 that the slave apparatus connected thereto is the slave MMC/SD apparatus 302, then at step S605, the master MMC/SD apparatus 301 loads the complete function of the master communication protocol stack device 307 and initializes it. After this, the master MMC/SD apparatus 301 sends data to the slave MMC/SD apparatus 302 to conduct bulk data storage or Ethernet communication.

At step S606, the slave controller 304 in the slave MMC/SD apparatus 302 further determines whether the received data is from the master bulk storage device 305 or from the master communication protocol stack device 307 by determining whether the data from the master MMC/SD apparatus 301 is sent to the special address. If it is determined that the received data is sent to the special address, the slave controller 304 forwards it to the slave communication protocol stack device 308, and then returns a response of the corresponding slave communication protocol stack device 308, thus achieving Ethernet communication. If it is determined that the received data is sent to an address generally used for bulk storage in the slave MMC/SD apparatus for example rather than the special address, the slave controller 304 will forward these data to the slave bulk storage device 306 and then returns a response of the corresponding slave bulk storage device 306, thus realizing a standard bulk storage process based on MMC/SD interface.

It should be noted that since the master bulk storage device 305 and the master communication protocol stack device 307 uses the same MMC/SD interface, according to an embodiment of the invention, it is also required that the operations on the master MMC/SD interface drive device 309 by the master bulk storage device 305 and the master communication protocol stack device 307 be atomic operations, so that the master bulk storage device 305 and the master communication protocol stack device 307 operate simultaneously and do not interfere with each other. Atomic operations are referred to the operations in embedded operation system that are not interrupted by thread scheduling mechanism. That is, in the process of operating the master MMC/SD apparatus of the invention which simultaneously supports bulk storage and Ethernet communication, the procedure for processing any one of the MMC/SD protocol commands cannot be interrupted.

In practice, since the master bulk storage device typically already exists in existing system of the embedded terminal apparatuses with a master MMC/SD interface and is generally not adapted, the master bulk storage device 306, when using the master MMC/SD interface drive device 309, is required to read the status of the master MMC/SD interface drive device and determine whether it is executing command. If any CMD command according to the MMC/SD protocol is being executed, the master bulk storage device 306 can only use the MMC/SD interface drive device when it is idle. Similarly, the master communication protocol stack device 307, when using the master MMC/SD interface drive device 309, also has to ensure that the operations at the time of executing the CMD commands according to the MMC/SD protocol are atomic operations. Those skilled in the art will understand that the specific implementation of atomic operations is not limited to some particular method; rather, the function of atomic operations can be achieved by the method of using the masked interruption provided by the embedded operation system, for example.

In addition, when implementing the master MMC/SD apparatus of the invention, if both the master bulk storage device 306 and the master communication protocol stack device 308 are re-designed without using existing master bulk storage device in the embedded terminal apparatuses with a master MMC/SD interface, the master controller 303 of the embedded terminal apparatuses with a master MMC/SD interface, i.e., the master controller 303 of the master MMC/SD apparatus 301, may use a concurrent processing mechanism provided by an embedded operation system such as semaphore, spin lock to ensure that the operations on the master MMC/SD interface drive device 309 by the master bulk storage device 305 and the master communication protocol stack device 307 are atomic operations. Those skilled in the art will understand that the specific implementation of atomic operations is not limited to the above described method.

By way of example, the master MMC/SD apparatus provided by the present invention can be realized in a cell-phone, PDA, laptop computer, POS machine or ATM with a MMC/SD master interface so that these devices can simultaneously conduct bulk storage and Ethernet communication when they are used with the slave MMC/SD apparatus provided by the present invention.

It is noted that the above particular embodiments are merely used for illustrating the technical solutions of the invention, not for limiting the invention. While the invention has been described in detail with reference to the above particular embodiments, those skilled in the art will understand that the particular embodiments of the invention can also be adapted or some technical features can be substituted equivalently without departing from the spirit of the invention. Such adaption or substitution will all fall within the scope of protection as claimed by the present invention.

The invention claimed is:

1. A master Multimedia Memory Card/Secure Digital (MMC/SD) apparatus for simultaneously supporting bulk storage and Ethernet communication, the master MMC/SD apparatus comprises:
   a master MMC/SD interface for providing access to a slave MMC/SD apparatus;
   a master MMC/SD interface drive device for controlling transfer of a MMC/SD signal over the master MMC/SD interface;
   a master bulk storage device for providing file system service and data management service for bulk storage;
   a master communication protocol stack device for achieving the Ethernet communication between the master MMC/SD apparatus and the slave MMC/SD apparatus; and
   a master controller for controlling operations of the master MMC/SD interface drive device, the master bulk storage device and the master communication protocol stack device;
   wherein the master bulk storage device and the master communication protocol stack device interact with the master MMC/SD interface drive device,
   wherein the master bulk storage device and the master communication protocol stack device are arranged to access physical addresses that are independent from each other in the slave MMC/SD apparatus,
   wherein the controlling operations performed on the master MMC/SD interface drive device by the master bulk storage device and the controlling operations performed on the master communication protocol stack device by the master bulk storage device are atomic operations,
   wherein a concurrent processing mechanism is used to ensure that the controlling operations are atomic operations,
   wherein when an Ethernet Emulation Model (EEM) packet is a data packet, a second field in the EEM packet comprises a check status field and a length field, wherein the length field is used to indicate the length of a payload field in the EEM packet, and the check status field is used to indicate whether a Cyclic Redundancy Check (CRC) check of an Ethernet data frame is on or off.

2. The master MMC/SD apparatus according to claim 1, wherein the master controller is used to send a probe command to the slave MMC/SD apparatus through the master communication protocol stack device and determines whether the slave MMC/SD apparatus supports the Ethernet communication according to a command return value.

3. The master MMC/SD apparatus according to claim 2, wherein the MMC/SD protocol layer module uses a MMC/SD data block to carry the EEM packet in one of the following manners: one MMC/SD data block contains one EEM packet; one MMC/SD data block contains a plurality of EEM packets; a plurality of MMC/SD data blocks contain one EEM packet; and a plurality of MMC/SD data blocks contain a plurality of separate EEM packets.

4. The slave MMC/SD apparatus according to claim 3, wherein the special address information is provided in a reserved sector after a main boot sector of the file system of the slave bulk storage device.

5. The master MMC/SD apparatus according to claim 1, wherein the master communication protocol stack device comprises following modules arranged sequentially from top to bottom:
   an application layer module for executing network application programs;
   a transmission layer module and a network layer module for executing an Ethernet protocol function;
   a data link layer module for packing the Ethernet data frame;
   a MMC/SD Ethernet Emulation Model (EEM) layer module for emulating an Ethernet card function for an upper layer protocol stack; and
   a MMC/SD protocol layer module for executing a MMC/SD protocol stack.

6. The master MMC/SD apparatus according to claim 5, wherein when the EEM packet is a command packet, the second field comprises a command type field and a command parameter field, wherein the command type field is used to define a type of EEM command, and the command parameter field is used to define parameters of the EEM command.

7. The master MMC/SD apparatus according to claim 1, wherein the MMC/SD EEM layer module transmits data in EEM packet format, wherein the EEM packet is composed of an EEM header field and the EEM payload field.

8. The master MMC/SD apparatus according to claim 7, wherein the EEM header field comprises a first field and the second field, and the first field is used to define a type of the EEM packet.

9. The master MMC/SD apparatus according to claim 1, wherein the master MMC/SD interface is a Mini-SD master interface, a Micro-SD master interface or a standard MMC/SD master interface.

10. A slave MMC/SD apparatus for simultaneously supporting bulk storage and Ethernet communication, the slave MMC/SD apparatus comprises:
    a slave MMC/SD interface for providing access to a master MMC/SD apparatus;
    a slave MMC/SD interface drive device for controlling transfer of MMC/SD signal over the slave MMC/SD interface;
    a slave bulk storage device providing corresponding file system service and data management service for bulk storage of the master MMC/SD apparatus;
    a slave communication protocol stack device for achieving the Ethernet communication between the slave MMC/SD apparatus and the master MMC/SD apparatus; and
    a slave controller for controlling operations of the slave MMC/SD interface drive device, the slave bulk storage device and the slave communication protocol stack device;

wherein the slave bulk storage device and the slave communication protocol stack device interact with the slave MMC/SD interface drive device, wherein a special address information is contained in the file system of the slave bulk storage device so that the slave MMC/SD interface drive device can provide two physical passages that are independent from each other, wherein a concurrent processing mechanism is used to ensure that the controlling operations are atomic operations, wherein when an Ethernet Emulation Model (EEM) packet is a data packet, a second field in the EEM packet comprises a check status field and a length field, wherein the length field is used to indicate the length of a payload field in the EEM packet, and the check status field is used to indicate whether a CRC check of an Ethernet data frame is on or off.

11. The slave MMC/SD apparatus according to claim 10, wherein the special address information is provided in a reserved sector after a main boot sector of each partition of the file system of the slave bulk storage device.

12. The slave MMC/SD apparatus according to claim 10, wherein an index for the special address information is provided in a reserved sector after a main boot sector of the file system of the slave bulk storage device.

13. The slave MMC/SD apparatus according to claim 10, wherein the length of the special address information is 512 bytes.

14. The slave MMC/SD apparatus according to claim 10, wherein that the slave controller is arranged to determine whether data received from the slave MMC/SD interface is used for bulk storage or for the Ethernet communication according to whether the data is sent to the special address.

15. The slave MMC/SD apparatus according to claim 10, wherein the slave communication protocol stack device comprises following modules arranged sequentially from top to bottom:
  an application layer module for executing network application programs;
  a transmission layer module and a network layer module for executing an Ethernet protocol function;
  a data link layer module for packing an Ethernet data frame;
  a MMC/SD EEM (Ethernet Emulation Model) layer module for emulating an Ethernet card function for an upper layer protocol stack; and
  a MMC/SD protocol layer module for executing a MMC/SD protocol stack.

16. The slave MMC/SD apparatus according to claim 15, wherein the MMC/SD EEM layer module transmits data in EEM packet format, wherein the EEM packet is composed of an EEM header field and the EEM payload field.

17. The slave MMC/SD apparatus according to claim 16, wherein the EEM header field comprises a first field and the second field, and the first field is used to define a type of the EEM packet.

18. The slave MMC/SD apparatus according to claim 16, wherein the MMC/SD protocol layer module uses MMC/SD data block to carry the EEM packet in one of the following manners: one MMC/SD data block contains one EEM packet; one MMC/SD data block contains a plurality of EEM packets; a plurality of MMC/SD data blocks contain one EEM packet; and a plurality of MMC/SD data blocks contain a plurality of separate EEM packets.

19. The slave MMC/SD apparatus according to claim 17, wherein when the EEM packet is a command packet, the second field comprises a command type field and a command parameter field, wherein the command type field is used to define a type of EEM command, and the command parameter field is used to define parameters of the EEM command.

20. The slave MMC/SD apparatus according to claim 10, wherein the slave MMC/SD interface is a Mini-SD slave interface, a Micro-SD slave interface or a standard MMC/SD slave interface.

21. A system for simultaneously supporting bulk storage and Ethernet communication, wherein the system comprises a master MMC/SD apparatus master Multimedia Memory Card/Secure Digital (MMC/SD) apparatus for simultaneously supporting bulk storage and Ethernet communication, the master MMC/SD apparatus comprises:
  a master MMC/SD interface for providing access to a slave MMC/SD apparatus;
  a master MMC/SD interface drive device for controlling transfer of MMC/SD signal over the master MMC/SD interface;
  a master bulk storage device for providing file system service and data management service for bulk storage;
  a master communication protocol stack device for achieving the Ethernet communication between the master MMC/SD apparatus and the slave MMC/SD apparatus; and
  a master controller for controlling operations of the master MMC/SD interface drive device, the master bulk storage device and the master communication protocol stack device;
wherein the master bulk storage device and the master communication protocol stack device interact with the master MMC/SD interface drive device, wherein the master bulk storage device and the master communication protocol stack device are arranged to access physical addresses that are independent from each other in the slave MMC/SD apparatus, wherein the controlling operations performed on the master MMC/SD interface drive device by the master bulk storage device and the controlling operations performed on the master communication protocol stack device by the master bulk storage device are atomic operations, wherein a concurrent processing mechanism is used to ensure that the controlling operations are atomic operations, wherein when an Ethernet Emulation Model (EEM) packet is a data packet, a second field in the EEM packet comprises a check status field and a length field, wherein the length field is used to indicate the length of a payload field in the EEM packet, and the check status field is used to indicate whether a Cyclic Redundancy Check (CRC) check of an Ethernet data frame is on or off and the slave MMC/SD apparatus according to claim 10, wherein the master MMC/SD apparatus and the slave MMC/SD apparatus perform both bulk storage and Ethernet communication via the same MMC/SD interface.

22. The system according to claim 21, wherein the Ethernet communication between the master MMC/SD apparatus and the slave MMC/SD apparatus employs a request-response mechanism, wherein a request command and a response command are both read from an identical special address in the slave MMC/SD apparatus.

23. The system according to claim 22, wherein when the Ethernet communication is being performed, the master MMC/SD apparatus is arranged to poll the slave MMC/SD apparatus periodically so as to receive data from the slave MMC/SD apparatus.

24. The system according to claim 21, wherein the master MMC/SD apparatus is a cell-phone, a Personal Digital Assistant (PDA), a laptop computer, a Point Of Sells (POS) machine or Automatic Teller Machine (ATM) with a MMC/SD master interface.

25. A method for simultaneously supporting bulk storage and Ethernet communication between a master MMC/SD apparatus and a slave MMC/SD apparatus, wherein the method comprises the following steps:
  a. when the master MMC/SD apparatus detects a connection to a slave MMC/SD apparatus, the master MMC/SD apparatus reads a specific location in the file system of the slave MMC/SD apparatus to obtain a special address information;
  b. the master MMC/SD apparatus sends a probe command to a special address and determines whether the slave MMC/SD apparatus is the slave MMC/SD apparatus according to claim 12 based on a command return value;
  c. if not, the master MMC/SD apparatus restores a previously stored special address information and executes a standard MMC/SD storing procedure; otherwise, the master MMC/SD apparatus loads a master communication protocol stack device and sends data to the slave MMC/SD apparatus;
  d. the slave MMC/SD apparatus determines whether the data from the master MMC/SD apparatus is used for bulk storage or for Ethernet communication according to whether the data is sent to the special address;
  e. if the data is sent to the special address, Ethernet communication is performed between the slave MMC/SD apparatus and the master MMC/SD apparatus; otherwise, the slave MMC/SD apparatus and the master MMC/SD apparatus perform a standard MMC/SD storing procedure together wherein a concurrent processing mechanism is used to ensure that the controlling operations are atomic operations, wherein when the EEM packet is a data packet, the second field comprises a check status field and a length field, wherein the length field is used to indicate the length of the payload field in the EEM data packet, and the check status field is used to indicate whether Cyclic Redundancy Check (CRC) check of Ethernet data frame is on or off.

* * * * *